(12) United States Patent
Hill et al.

(10) Patent No.: US 6,966,433 B1
(45) Date of Patent: Nov. 22, 2005

(54) GUIDE PLATED FOR ROLLER-CHAIN CONVEYOR

(76) Inventors: Michael L. Hill, 410 Welby Ct., Silverton, OR (US) 97381; Patrick G. Hill, 6800 Gold Creek Rd., Willamina, OR (US) 97396

( * ) Notice: Subject to any disclaimer, the term of this patent is extended or adjusted under 35 U.S.C. 154(b) by 0 days.

(21) Appl. No.: 10/771,922

(22) Filed: Feb. 4, 2004

Related U.S. Application Data

(60) Provisional application No. 60/446,155, filed on Feb. 10, 2003.

(51) Int. Cl.[7] ............................................ B65G 15/60
(52) U.S. Cl. ................................................... 198/841
(58) Field of Search .............................. 198/841, 692; 144/242.1, 245.1, 245.2; 5/299

(56) References Cited

U.S. PATENT DOCUMENTS

| | | | |
|---|---|---|---|
| 3,713,181 A * | 1/1973 | Hougland .................... | 5/176.1 |
| 3,858,713 A * | 1/1975 | Allen .......................... | 198/692 |
| 4,078,592 A | 3/1978 | Standal | |
| 4,106,538 A * | 8/1978 | Sigfridsson et al. ..... | 144/242.1 |
| 4,358,010 A * | 11/1982 | Besch ......................... | 198/841 |
| 4,753,338 A * | 6/1988 | Ketonen ...................... | 198/692 |
| 4,997,080 A * | 3/1991 | Stroud et al. ............... | 198/692 |
| 6,105,477 A | 8/2000 | Olson | |
| 6,269,939 B1 * | 8/2001 | Lapeyre et al. ............. | 198/615 |
| 6,422,382 B1 * | 7/2002 | Ertel et al. ............... | 198/860.1 |

* cited by examiner

*Primary Examiner*—Richard Ridley
(74) *Attorney, Agent, or Firm*—Brian C. Trask

(57) ABSTRACT

A roller-chain conveyor includes a guide plate to support the load carried by the roller-chain conveyor belt, and to maintain the roller-chain on a consistent track. A guide plate is carried on top of a stiff foundation plate to resist load-induced deflection. Foundation plates desirably carry hold-down structure adapted for reception in socket structure formed in the guide plate. Operable socket structure can be formed to include a T-slot. A cooperating hold-down structure is a mushroom-shaped peg affixed to the foundation plate. Such a guide plate is installed by lowering the guide plate onto the foundation plate to place the peg into reception in the socket. Then, the guide plate is slid axially to engage a rim of the T-slot under the mushroom head. One or more fasteners is then typically placed through the guide plate and into the foundation plate to resist axial motion effective to decouple the peg and socket. Guide plates desirably are made from a plastic material, such as Tyvar 88.

23 Claims, 7 Drawing Sheets

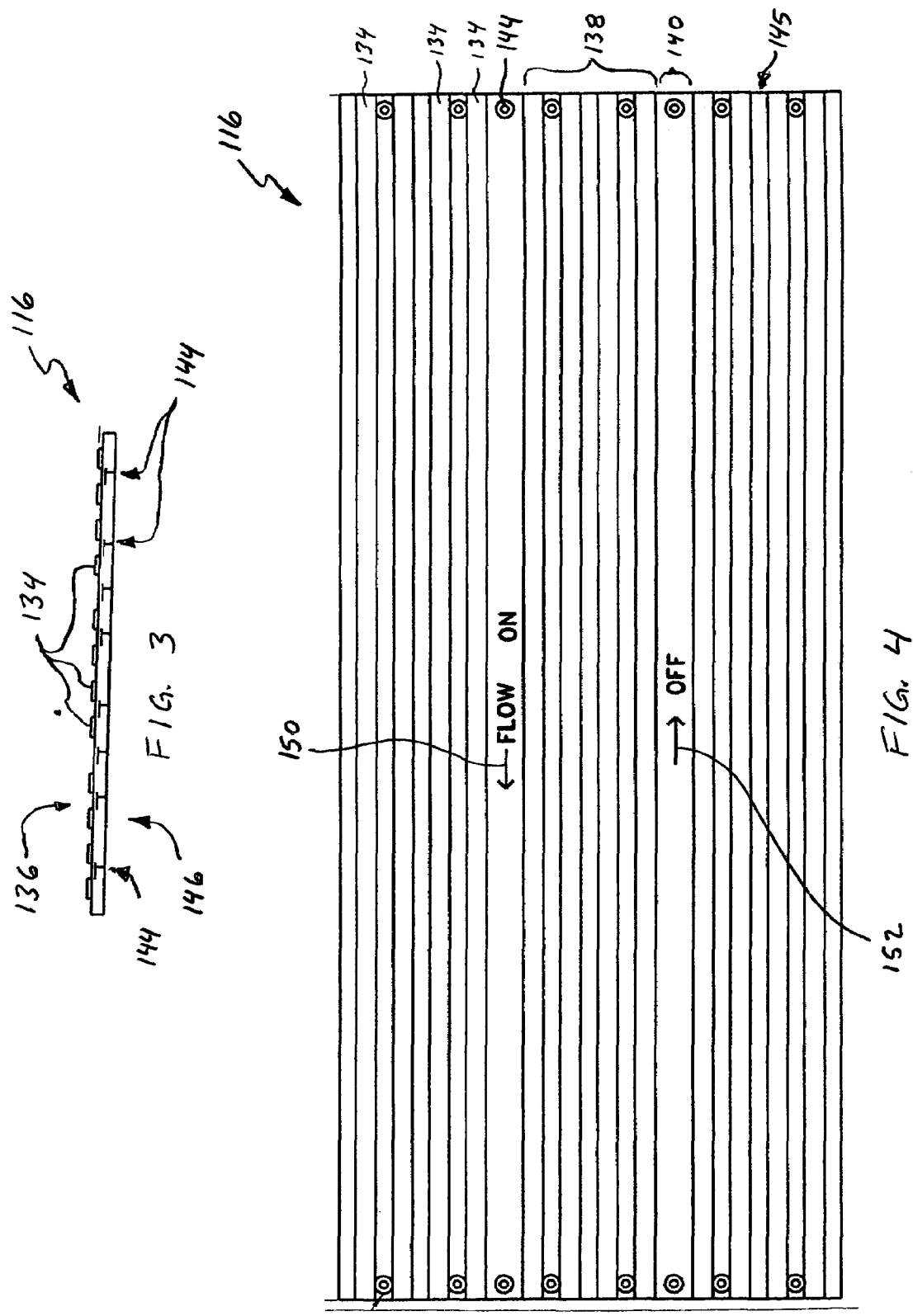

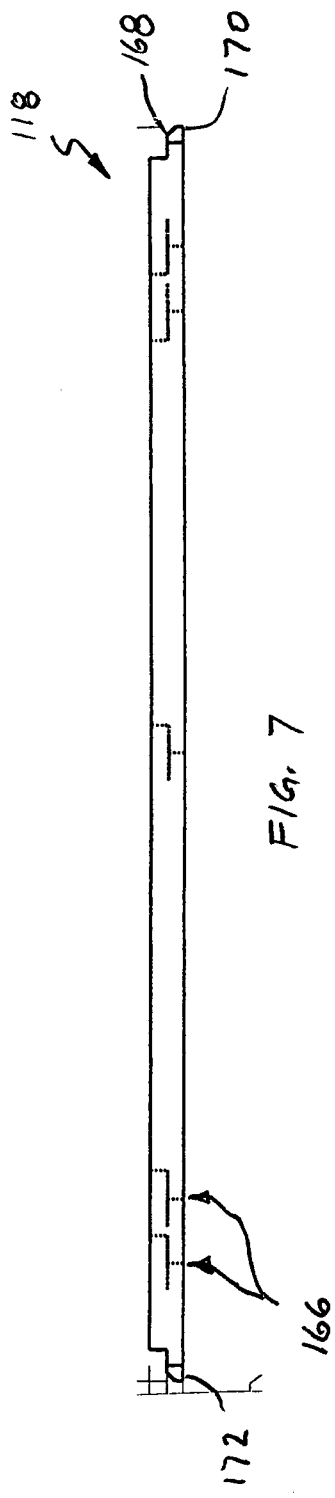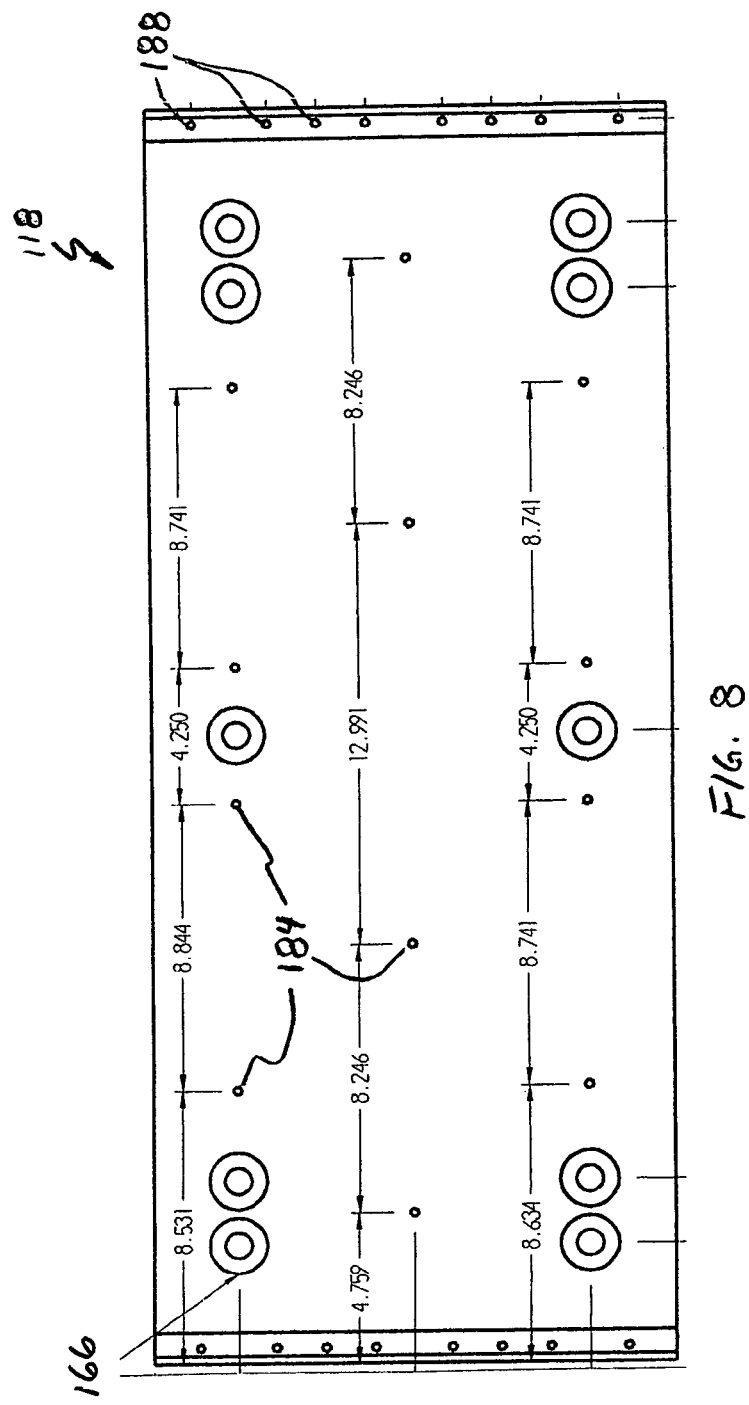

GUIDE PLATED FOR ROLLER-CHAIN CONVEYOR

RELATED APPLICATIONS

This application claims the benefit under 35 U.S.C. 119(e) of the filing date of Provisional Application Ser. No. 60/446, 155, filed Feb. 10, 2003, for "GUIDE PLATE FOR ROLLER-CHAIN CONVEYOR".

BACKGROUND

1. Field of the Invention

This invention relates to a load-bearing support and guide for one or more roller-chains of a roller-chain conveyor. It is particularly directed to a guide plate for a multi-strand, multi-chain, sharp-chain conveyor.

2. State of the Art

Conveyors are well known, and are useful to transport objects over a distance. Belt conveyors provide a continuous moving platform on which the object is placed for transport. One type of heavy-duty belt conveyor uses roller-chain as the belt material. A loop of the roller-chain is entrained around a pair of spaced apart sprocket assemblies to form a stretch of roller-chain disposed as a load carrying platform. The stretch of roller-chain typically is supported by a guide plate that provides structure arranged to support rollers of each strand of chain to carry the weight of the load, and also to resist transverse deflections of the chain strands from a substantially straight-line path between the sprocket assemblies.

One type of roller-chain conveyor is used in the timber industry to transport logs through edgers, or saw mills. Typically, such conveyors use roller-chains of the type known as sharp-chains. A sharp-chain includes structure arranged to protrude from one side of a chain strand, transverse to a roller axis, and to provide a high friction surface to resist back-sliding, or slipping, of the load. Generally, side plates of sharp-chains are provided with a triangular portion, or other high friction shape, adapted to gouge into a log, or other load.

In any case, the roller-chain of a commercially available heavy-duty conveyor typically is supported on a guide plate made from metal. The guide plate provides a foundation on which chain rollers travel, by rolling, to support the weight of the load being transported. A guide plate can also keep the chain strand running in a consistent track or path between sprocket assemblies. Original equipment guide plates typically are made from 1018 steel and are case hardened. Certain aftermarket replacement guide plates are made from 4140 steel and are through-hardened to about 50–52 Rockwell.

The roller-chain and guide plate inherently rub at a contact interface, which is exacerbated by any load supported on the conveyor, and so are oiled at regular intervals to reduce friction induced wear. Oiling is generally accomplished by applying a spray mist of oil on an automated and timed schedule to distribute oil to successive different spots of a chain loop, eventually providing complete coating of the chain length. As an example, a 5 second pulse of oil mist may be applied each 50 seconds, with complete coverage of the entire length of chain taking about 10 minutes. A substantial amount of oil can be consumed in such a process. Furthermore, the oil typically used with such conveyors is an expensive synthetic oil. One commercial operation is currently consuming approximately 2,000 gallons of oil per month to lubricate a pair of conveyors included in a sawmill. It would be an improvement to provide a guide plate operable to reduce oil consumption.

Regardless of the amount of oil applied to the conveyor, the guide plate will eventually wear and require replacement. Commercially available guide plates are commonly bolted to a foundation substrate in multiple distributed locations, using a plurality of fasteners. It can be time consuming to remove and reinstall the plurality of fasteners to replace a worn guide plate. It would be an improvement to provide a guide plate that can be installed, and replaced, in a reduced time interval.

BRIEF SUMMARY OF THE INVENTION

The present invention provides an apparatus for guiding a roller-chain conveyor, and a method for installing a roller-chain guide plate in a short amount of time. The invention can be embodied as an improved conveyor of the type in which a length of roller-chain is entrained around first and second spaced apart sprocket assemblies to dispose a stretch of the roller-chain for load bearing on a guide plate interposed between the first and second sprocket assemblies. Such an arrangement enables the roller-chain to transport a load in an axial direction defined by an axis oriented along the stretch of roller-chain.

The present invention provides a low friction roller-chain bed plate that generally includes a foundation plate and the aforementioned guide plate. A top surface of the foundation plate (if present) receives a bottom surface of the guide plate in a stacked arrangement. Desirably, a foundation plate is formed from a first material (typically a metal such as steel) and is adapted for attachment to structure of the conveyor. A guide plate typically is formed from a second material and is adapted for removable attachment to a foundation. The guide plate typically is formed from a tough plastic, although other tough, wear resistant, and slippery materials also are operable. An exemplary guide plate can be formed from a sheet of plastic material having mechanical wear and tribological properties similar to Tyvar 88 plastic material.

One preferred embodiment of a foundation plate is formed from a generally planar section of steel plate, or a similar load supporting structure, such as a metal casting. The foundation plate desirably includes a hold-down structure disposed on its top surface. An operable hold-down structure generally includes a vertical member and a transverse member. In an installed hold-down structure, the vertical member spaces the transverse member apart from a top surface of the foundation plate.

A currently preferred guide plate, structured to cooperate with the preferred foundation plate, includes a socket opening toward the bottom surface of the guide plate. Such a socket desirably is structured and arranged to receive the hold-down structure in a slide-together fit to effect an installed configuration and to resist vertical separation between the guide plate and the foundation plate.

One currently preferred socket includes a portion fashioned as a T-slot. A cross-section of such a T-slot resembles the letter "T". In such a configuration, a rim of the socket forms the necked-down portion defining the stem of the "T". The socket opens to the bottom of the guide plate to receive hold-down structure projecting above the foundation plate. Desirably, the socket is contained within the thickness of the guide plate to leave a top surface of the guide plate intact and uninterrupted over the socket.

A currently preferred socket includes a rim structured for capture by the transverse member of the hold-down structure. The transverse member creates a vertical structural interference with the rim to resist separation, in a direction normal to the top surface of the foundation plate, of the guide plate away from the foundation plate. Of course, a plurality of hold-down structures can be provided, desirably distributed over an area of the foundation plate. In such case, a cooperating plurality of sockets is arranged to engage with the plurality of hold-down structures.

A less desirable socket can be fashioned as a countersunk bore penetrating the guide plate and receiving a hold-down bolt threaded into the foundation plate. A guide plate carrying one or more such sockets can be placed onto a foundation plate, and directly bolted to that foundation plate. However, such an open-top bore arrangement undesirably interrupts a top surface of the guide plate. The open top of the bore can collect debris and lead to increased wear of the guide plate.

It is desirable, in certain embodiments, for a vertical member of a hold-down structure to be arranged in harmony with wall structure of a socket to form an axial structural interference. Such an axial structural interference can resist motion of the guide plate, in an axial direction, beyond the installed position. Furthermore, it is desirable for the vertical member to form a transverse structural interference with socket wall structure to resist motion of the guide plate, in a direction transverse to a roller chain, away from the installed position.

One hold-down structure within contemplation has an enlarged head carried on a vertical stem, like a mushroom. The hold-down structure can be assembled, or affixed, to a foundation plate by press-fitting the stem into receiving structure of a foundation plate. The stem may also be threaded into receiving structure of a foundation plate. A cross-section through either a head or a stem can be any of a variety of shapes, including square, rectangular, oval, or round. One currently preferred hold-down structure includes a cylindrical stem supporting a cylindrical head that has a larger diameter than the stem. It is within contemplation for a hold-down structure to be fashioned as a simple bolt, such as a socket head cap head screw or a machine bolt. Such a fastener may include a shoulder to assist in installing the bolt head at a consistent height relative to the top surface of the foundation plate.

One or more hold-down structures are generally part of a hold-down system operable to resist motion of a guide plate, in an axial or transverse direction, away from an installed position. A hold-down system may also include one or more fasteners and one or more standoffs. A fastener typically is disposed near an end of a guide plate and generally is oriented for anchoring to structure associated with the foundation plate. A standoff typically is disposed to receive the fastener through a thickness of the guide plate. Desirable standoffs are configured and arranged to resist over-tightening of the fastener. Fasteners typically are threaded to facilitate their removal to replace a worn guide plate.

A preferred bed plate can be assembled by placing a bottom of a guide plate on top of a foundation plate in a stacked relation, with hold-down structure fitting into receiving portions of socket structure. The guide plate is then displaced, in an axial direction parallel to the top of the foundation plate, to slide a socket rim portion into reception between a transverse member of holding structure and a top of the foundation plate. Desirably, the axial direction is in correspondence with the direction in which the roller chain will run under load so that operation of the conveyer tends to urge the guide plate toward an installed position. One or more fastener can then be secured to structure associated with the foundation plate or other conveyor structure suitable for use as an anchor. Such an anchor can operate to hold the guide plate in an installed position, and to resist disengaging the one or more sockets from their corresponding holding structures. One or more fastener typically is placed in piercing engagement through the guide plate, near an edge of the guide plate, and is anchored to the foundation plate. A standoff can be included to resist overtightening the anchoring fastener.

A lubricated sliding interface between the roller-chain and the improved guide plate generally has a coefficient of friction lower than a corresponding coefficient of friction between steel-on-steel. At least, the lubricated sliding interface between the roller-chain and the improved guide plate has a coefficient of friction lower than a corresponding coefficient of friction between the roller-chain and a hardened steel surface. Desirably, the lubricated sliding interface between a roller-chain and a chain support guide surface of the guide plate has an effective dynamic coefficient of friction lower than about 0.08.

The invention may also be characterized as a bed plate for a roller-chain conveyor assembly. Such a bed plate includes a foundation platform and a guide plate. A top surface of the foundation platform receives a bottom surface of the guide plate in a stacked arrangement. Generally, the foundation platform is adapted for attachment to structure of the conveyor. An operable guide plate includes a material having a coefficient of dynamic friction, at a lubricated interface with a roller-chain supported thereon, of less than about 0.08. Desirably, the guide plate is adapted for removable attachment to the foundation platform. A top surface of the guide plate typically carries a plurality of ridge elements that are configured for reception between side plates of a strand of the roller-chain whereby to guide the strand along an axial path. Furthermore, a top surface of the ridge elements usually is adapted to support a roller element of the roller-chain for rolling engagement thereon.

An exemplary bed plate preferably includes first hold-down structure carried by a guide plate and second hold-down structure carried by a foundation platform. Those first and second hold-down structures are mutually arranged to form an interlocking engagement effected by an axial displacement of an installed guide plate relative to the foundation platform. Engagement between those two hold-down structures causes a structural interference operable to resist vertical displacement of the guide plate, in a direction normal to the top surface of the foundation platform, away from engagement with the foundation platform. The hold-down structures also desirably create a transverse structural interference to resist displacement of the guide plate in a direction transverse to a roller-chain of the conveyor on which the bed plate is installed.

The invention may also include one or more retaining pin installable to pierce structure associated with the guide plate for reception of a portion of the retaining pin in structure associated with the foundation platform. Such an installed retaining pin can operate to resist an axial displacement of the guide plate from its installed axial position. Other anchoring structure is within contemplation, including a stop block anchored to resist axial motion of a guide plate in a direction away from an installed position.

BRIEF DESCRIPTION OF THE DRAWINGS

In the drawings, which illustrate what are currently considered to be the best modes for carrying out the invention:

FIG. 3 is an end view of an exemplary guide plate;

FIG. 4 is a top view of the end plate illustrated in FIG. 3;

FIG. 7 is side view in elevation of a foundation plate suitable for use in combination with the guide plate illustrated in FIG. 3;

FIG. 8 is a top view of the foundation plate illustrated in FIG. 7;

DETAILED DESCRIPTION OF THE ILLUSTRATED EMBODIMENTS

Figure 1:
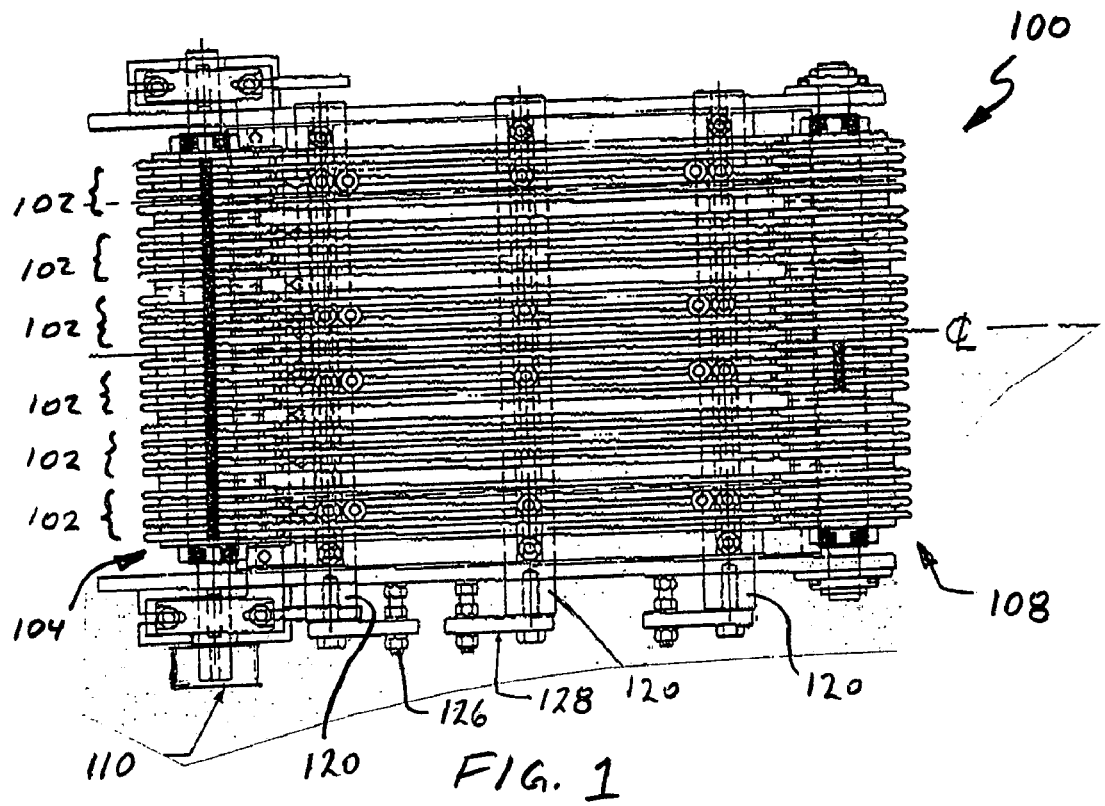
FIG. 1 is a top view of a roller-chain conveyor assembly constructed according to principles of the invention.
Figure 2:
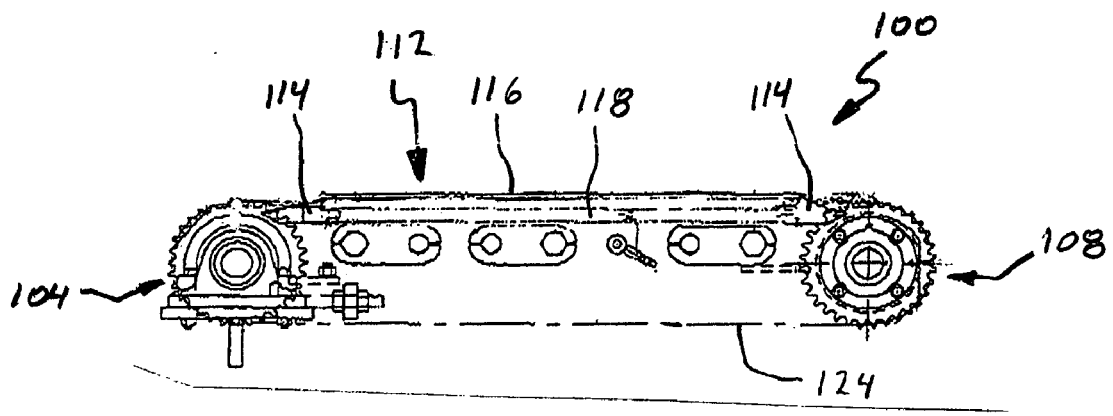
FIG. 2 is a side view of a portion of the conveyor assembly illustrated in FIG. 1, and with the roller-chains removed.

FIGS. 1 and 2 illustrate a roller-chain conveyor constructed according to principles of the invention, and indicated generally at 100. Embodiment 100 is adapted to carry six, four-strand roller-chains 102 entrained about spaced apart left and right gang sprocket assemblies, indicated generally at 104 and 108 respectively. One or both sprocket assemblies 104, 108 can be driven to move the roller-chains 102 to transport a load. As illustrated in FIG. 1, sprocket assembly 104 can be driven by a motor 110, or by some other sort of drive arrangement, such as a belt or drive chain.

One operable roller-chain for use in the conveyor 100, when adapted for use in the timber industry, is designated as 80-4-STD sharp-chain. A sharp-chain may be regarded as a sort of roller-chain that is adapted to carry structure protruding from one side of the chain that is configured to provide a high friction surface to support a load. A conveyor 100 may include any number of roller-chains, with each roller-chain having any number of strands, from one strand up to a desired number. In general, four, six, or eight strands are typical per chain, although more strands are also workable. For purpose of this disclosure, a strand is considered as including a roller, and adjacent side plates to hold an axle on which the roller is entrained to form an operable chain.

A conveyor 100 often is used in a saw mill, where a pair of such conveyors 100 typically are disposed one each on opposite sides of a sawbox. Of course, the invention can also be used in any other industry that makes use of roller-chain type conveyors, or that uses conveyor belts benefitting from a support platform constructed according to principles of the invention. A conveyor 100 may be sized in length and width to suit a particular application. Furthermore, any number of conveyors may be placed substantially end-to-end, to form a segmented conveyor having any desired length.

With reference to FIG. 2, the conveyor 100 includes a bed plate, generally indicated at 112, and a pair of end fingers 114. The bed plate 112 typically includes a guide plate 116 supported by a foundation plate 118. A foundation plate 118 is a stiff member to resist deflections caused by a load carried by the chains 102. Typically, a foundation plate 118 is made from a metal, such as steel. In the illustration of FIG. 1, the bed plate 112 is attached to a plurality of mounting bars 120 to dispose the guide plate 116 for carrying roller-chain 102 approximately at or slightly above a top portion of a pitch line 124 between sprocket assemblies 104 and 108. An installed position of mounting bars 120 desirably is adjustable to align a bed plate 112 between sprocket assemblies 104 and 108. One way to accomplish adjustment of an installed position for the bed plate 112 is illustrated in FIG. 1, and includes jam-nut shafts 126 and linkage rods 128.

With reference to FIGS. 3 and 4, the guide plate 116 carries guide structure 134 on a top surface, generally indicated at 136. A guide plate 116 can be made by a variety of traditional manufacturing procedures, including separately or in combination: casting, molding, extruding, and machining. Guide structure 134 is arranged to form a rolling support surface for a roller element of a roller-chain, and to fit between the side plates of a chain strand to resist transverse motion of the strand on the chain path between sprocket assembly 104 and sprocket assembly 108. Illustrated guide plate 116 has a number of guide structures 134 arranged as a group 138 spaced from other guide structures 134 to hold a roller-chain having a corresponding number of strands to the number of elements 134 in a group 138. The illustrated guide plate 116 is adapted to carry three, four-strand roller chains. Two plates 116 are placed side-to-side to form the bed plate surface illustrated in FIG. 1.

Socket structure 144 is located near an edge 145 and opens to a bottom surface 146 of the guide plate 116. Socket structure 144 is also open to top surface 136. Socket structure 144 can be provided to receive retaining pin structure operable as an anchoring structure effective to resist movement of the guide plate 116 from an installed position on a foundation plate 118. It is also within contemplation for alternative retaining structure, not piercing the guide plate 116, to be adapted to resist movement of an end 145 subsequent to locating a guide plate in position on a foundation plate 118.

One anchoring structure within contemplation includes a stop block disposed at an end of a guide plate 116 subsequent to placing the plate 116 into an installed position. Such a stop block is anchored into an axial motion-blocking position with respect to the installed guide plate 116. Such a stop block could be inserted into a transversely disposed dovetailed slot in a foundation plate 118, and then pinned or otherwise secured from transverse motion. In any case, a quickly removable mounting arrangement for anchoring structure is preferred to facilitate changing out a worn guide plate 116.

A load flow direction can be inscribed on the guide plate 116, as indicated by arrow 150. Desirably, load flow direction 150 is also the direction of displacement to accomplish assembly of a guide plate onto a foundation plate 118. Arrow 152 can also be placed onto a guide plate 116 to indicate a direction for motion of the guide plate 116 relative to a foundation plate 118 for disassembly of the components.

Figure 5:
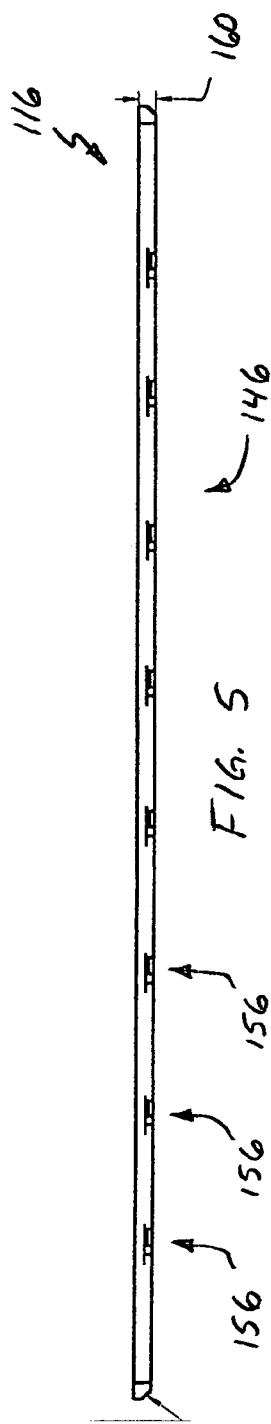
FIG. 5 is a side view in elevation of the guide plate illustrated in FIG. 3.
Figure 6:
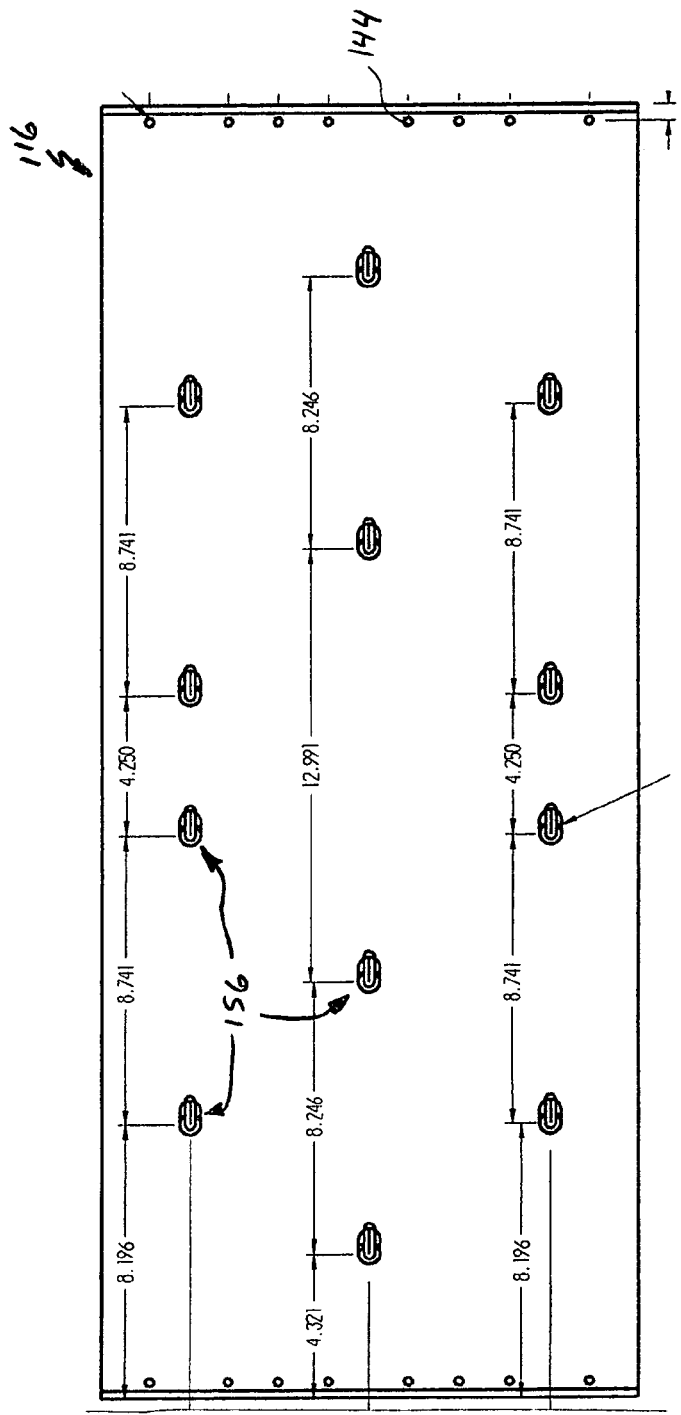
FIG. 6 is a bottom view of the guide plate illustrated in FIG. 3.

With reference to FIGS. 5 and 6, socket structure, generally indicated at 156, is open to bottom surface 146. Socket structure 156 desirably is contained within the thickness 160 of guide plate 116 to maintain an uninterrupted surface 136 in the area above the socket 156. The uninterrupted surface resists collection of debris, provides a smooth rolling surface for roller elements of chains, and generally helps resist wear of the top surface 136.

It is currently preferred to machine guide plates 116 from solid billets of a plastic. Plastics suitable for service as a guide plate 116 include relatively tough plastics, such as Tyvar 88 and Endra. Such materials may be obtained from Munnell & Sherrill, Inc., having a mailing address of P.O. Box 13249, Portland, Oreg. 97213. Other materials may also be used to form guide plates 116 constructed in accordance with principles of the invention, including metal, such as steels, and including 4140 or 1018. It is desirable for a guide plate to be constructed from a material that is oil resistant, to tolerate oil carried on a roller-chain; tough, to be wear resistant for long life and low maintenance; and slippery, to reduce friction at an interface with a roller-chain. Of course, it is recognized that certain other manufacturing methods are also workable, including molding, extruding, and casting. Various manufacturing methods may be used in combination to form a workable guide plate 116.

A foundation plate 118, operable to support a guide plate 116 is illustrated in FIGS. 7 and 8. The foundation plate 118 provides a transversely stiff member to support the load transported on a conveyor chain. Typically, foundation plate 118 is formed from a metal. Foundation plate 118 includes a plurality of bores 166 to receive fasteners for attachment of plate 118 to cross-members 120 (see FIG. 1). A notch 168 is included at ends 170 and 172 to accommodate end fingers 114 (see FIGS. 1 and 14). A plurality of holes 184 are provided in foundation plate 118 in which to receive hold-down structure, such as peg 186 (see FIGS. 9 and 10. Holes 184 may be smooth-walled or threaded, as desired. Also, holes 188 (typically threaded) are provided in foundation plate 118 to receive fasteners to attach end fingers 114 to the foundation plate 118. End fingers 114 can be structured and arranged to operate as anchor structure for an installed guide plate 116.

Figure 9:
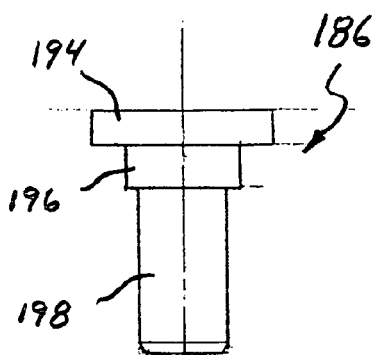
FIG. 9 is a side view in elevation of a first hold-down structure.
Figure 11:
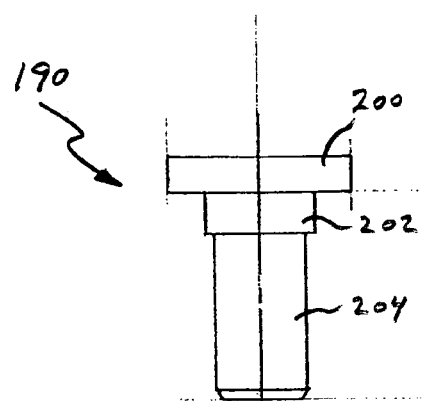
FIG. 11 is a side view in elevation of a second hold-down structure.
Figure 10:
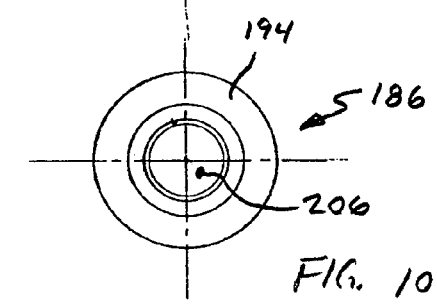
FIG. 10 is a top view of the hold-down structure illustrated in FIG. 9.
Figure 12:
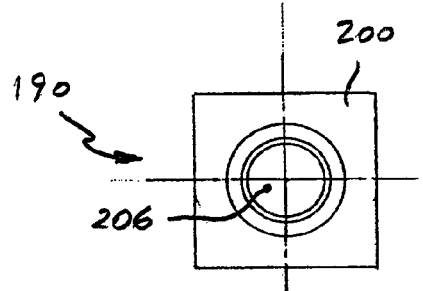
FIG. 12 is a top view of the hold-down structure illustrated in FIG. 11.

Certain hold-down structure within contemplation is illustrated in FIGS. 9 through 11. A first hold-down structure can be characterized as a peg, generally indicated at 186. A second hold-down structure can also be characterized as a peg, generally indicated at 190. Peg 186 includes a round head 194, a shoulder 196, and a stem 198. Peg 190 includes a rectangular head 200, a shoulder 202, and a stem 204. Socket structure 206 can be adapted to receive a tool (not illustrated) to turn threaded stems 198 and 204 respectively, into reception in threaded holes 184. Alternatively, stems 198 and 204 may be embodied as smooth cylinders for press-fit engagement in smooth-walled holes 184.

Figure 13:
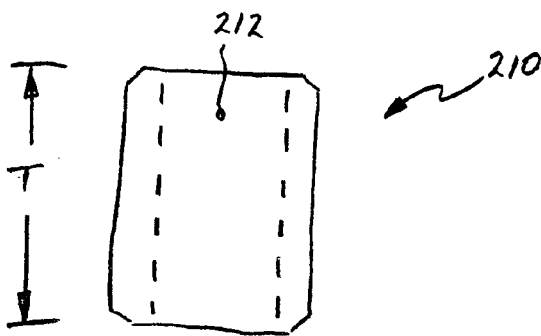
FIG. 13 is a side view in elevation of a stand-off.

With reference now to FIGS. 13 and 5, a standoff, generally indicated at 210, may be used to support a threaded fastener placed through a hole 144 to prevent overtightening of the fastener when affixing a plastic guide plate 116 to a foundation plate 118. A bore 212 is sized to accommodate such a fastener. The height T of such a standoff 210 is generally sized in conformance with the thickness 160 of a guide plate 116 at the fastener location.

Figure 14:
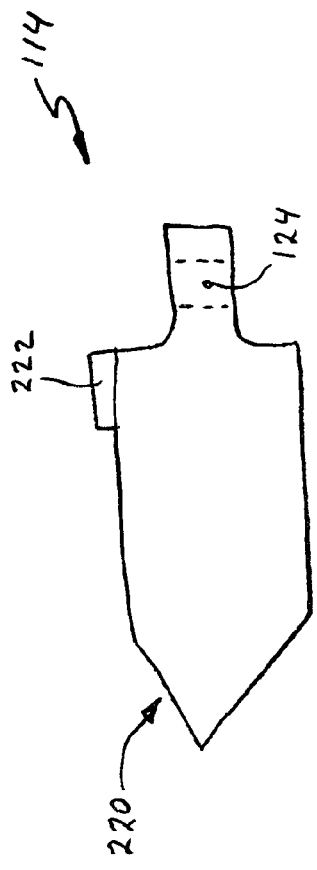
FIG. 14 is a side view in elevation of end fingers commonly used in the apparatus illustrated in FIG. 1.
Figure 15:
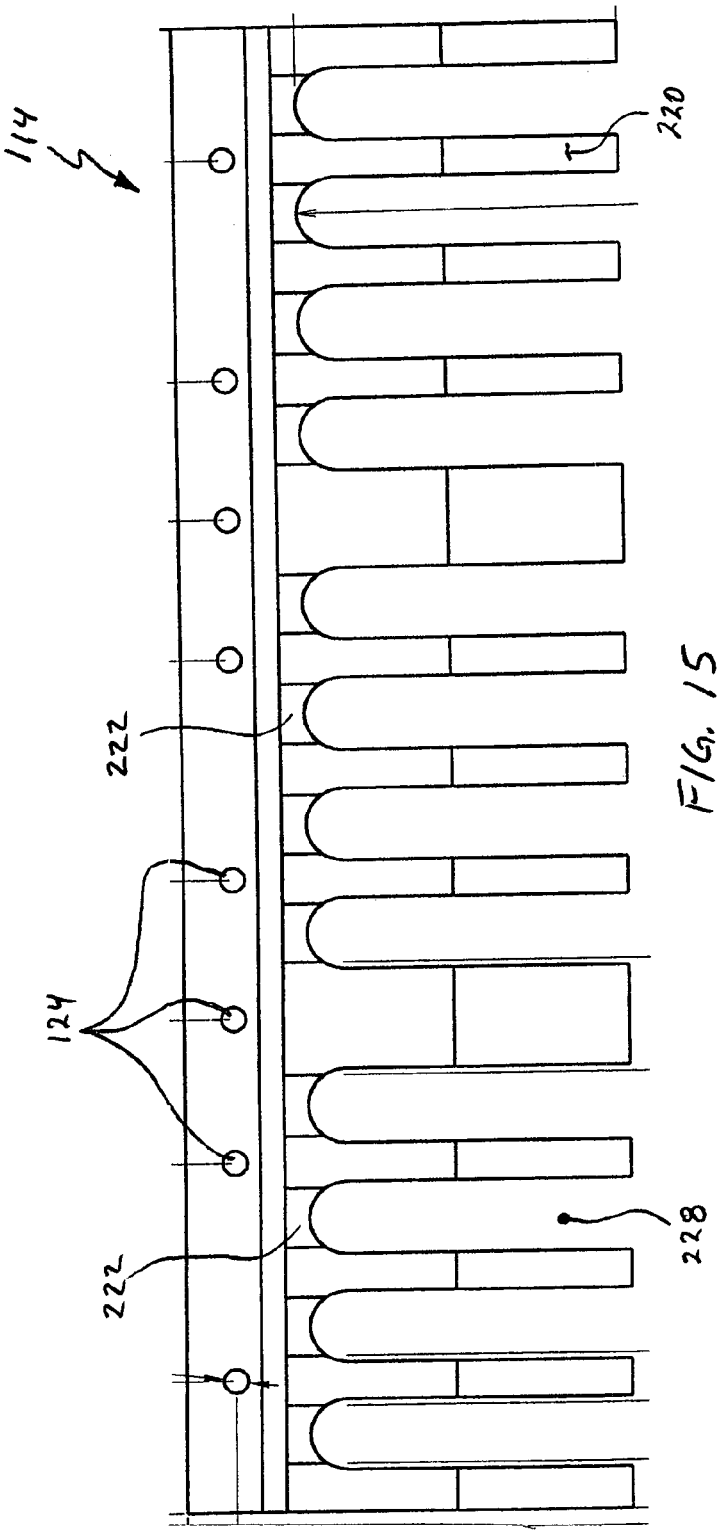
FIG. 15 is a top view of end the fingers illustrated in FIG. 14.

Certain desirable features of end fingers 114 are illustrated in FIGS. 14 and 15. A leading ramp 220 is provided to ensure a load rides over a guide plate 116 without snagging on an edge. A plurality of lead-in ramps 222 are provided to assist a roller in engaging onto a roller supporting surface of guide structure 134. A plurality of bores 224 are provided to receive fasteners 226 (see FIG. 20) which simultaneously secures a guide plate 116 and end fingers 114 to a foundation plate 118. A plurality of slots 228 are arranged to permit debris to fall from under rollers of a chain, such as roller-chain 102.

Figure 16:
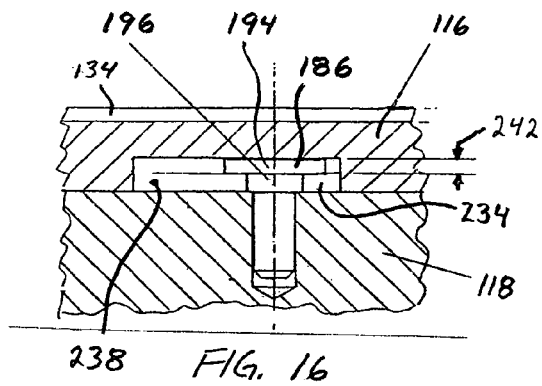
FIG. 16 is a side view, partially in section, illustrating one currently preferred method of assembly of a guide plate onto a foundation structure.
Figure 17:
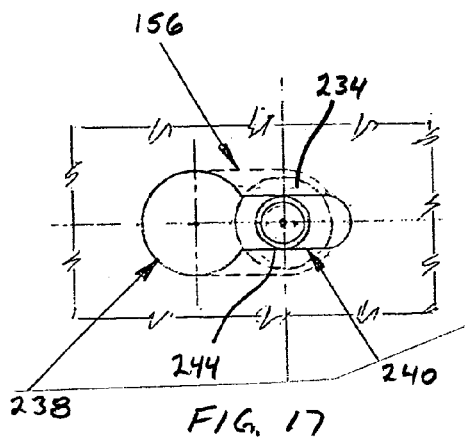
FIG. 17 is a bottom view of the structure illustrated in FIG. 16.

FIGS. 16 through 19 illustrate details of construction and assembly of hold-down structure and a receiving socket. In FIGS. 16 and 17, peg 186 is installed in engagement with T-slot structure of a socket 156. A rim 234 of socket 156 is sized in agreement with shoulder structure 194 to permit assembly of a guide plate 116 by sliding the plate 116 in a direction parallel to a top surface of foundation plate 118. Rim 234 is received in a captured relation under head 194 to resist a vertical movement of guide plate 116 away from foundation plate 118.

Still with reference to FIGS. 16 and 17, socket 156 includes an entrance portion 238 and a T-slot portion 240. Entrance portion 238 accommodates insertion of head 194 when a guide plate 116 is placed into position for engagement to hold-down structure, such as peg 186. T-shaped slot 240 has a thickness 242 to permit head 194 entrance during assembly of the plates. In general, a wall 244 of the T-slot 240 engages shoulder 196 to resist a transverse displacement of the guide plate 116 relative to a foundation plate 118. It is also within contemplation for shoulder 196, or head 194 to form a structural interference with a wall of socket 156 operable to resist axial movement of the guide plate 116 beyond a desired installed position.

Figure 18:
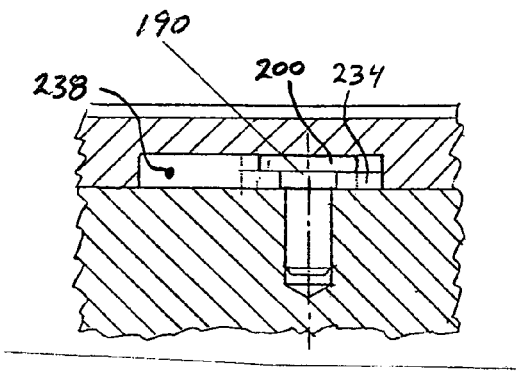
FIG. 18 is a side view, partially in section, illustrating a second currently preferred method of assembly of a guide plate onto a foundation structure.
Figure 19:
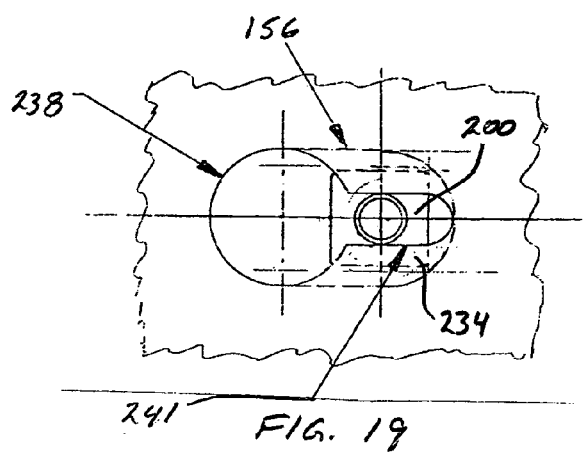
FIG. 19 is a bottom view of the structure illustrated in FIG. 18.

With reference now to FIGS. 18 and 19, a similar socket 156 is illustrated in an installed position relative to peg 190. Comparing FIGS. 19 and 17, it can be seen that rectangular head 200 may provide increased capture of rim structure 234 vs. a round-headed peg 186.

Figure 20:
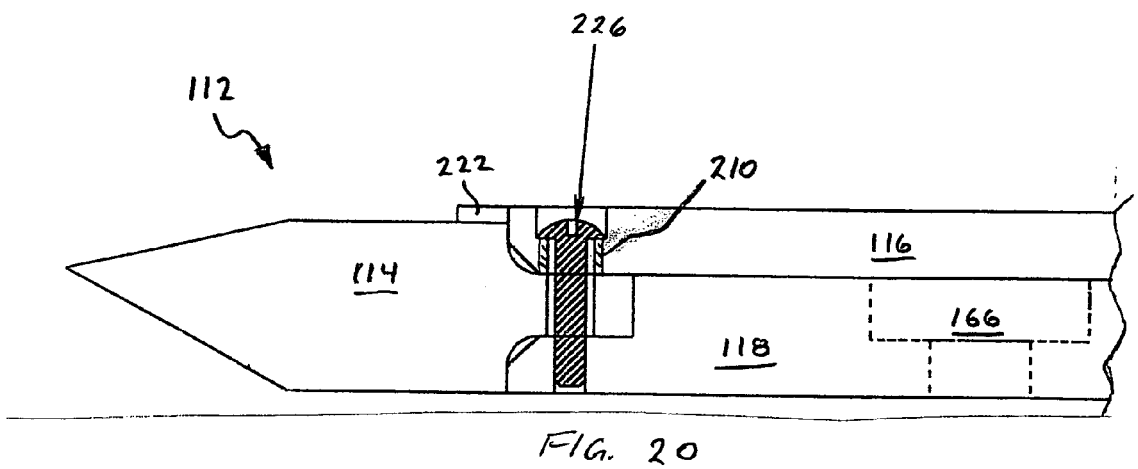
FIG. 20 is a side view in elevation and in section of an end portion of an assembled bed plate according to the invention.

FIG. 20 illustrates an end portion of a bed plate 112, and shows one arrangement operable to assemble a guide plate 116, and end fingers 114, onto a foundation plate 118. Guide plate 116 is illustrated in an installed position, with hold-down structure engaged in socket structure (not illustrated). Subsequent to sliding guide plate 116 into an installed position butting up against end fingers 114, one or more fastener 226 is placed in piercing engagement through guide plate 116, end fingers 114, and is captured in foundation plate 118. At an opposite end of bed plate 112, an end fingers 114 may be slid into place, and retained in a similar manner.

It is within contemplation to provide hold-down structure and cooperating socket structure configured other than as illustrated. For example, a hold-down structure within contemplation may be fashioned as an axially oriented rail having a cross-section that can be characterized as a T-shape. A rail such as described can be arranged to extend any length along a foundation plate, including substantially end-to-end. One or more such rails may be placed in a transverse distribution across a foundation plate. Such rail-like hold-down structure may be attached as additional structure to a foundation plate 118, or may be formed from the plate 118 directly. A mating guide plate 116 would carry axially oriented socket structure arranged cooperatively with the rail cross-section(s). Such a guide plate 116 would be assembled to a foundation plate 118 by placing the guide plate bottom surface in the plane of the top surface of the foundation plate, then sliding the guide plate axially into engagement with the hold-down structures. A retaining structure would then be installed to resist movement of the guide plate in a direction to uncouple the socket and hold-down structures.

One alternate retaining structure within contemplation includes arranging a set of end fingers as an end-stop for an edge 145 of a guide plate 116. Such a configuration could provide a completely uninterrupted top surface 136 to enhance life of a guide plate. Furthermore, a guide plate 116 with such a configuration could be extruded, and simply cut to length. Therefore, manufacturing costs would be reduced by simplifying the process and reducing a number of steps required to form a guide plate. Additionally, installation and replacement time for such an alternative guide plate 116 would also be reduced.

While the invention has been described in particular with reference to certain illustrated embodiments, such is not intended to limit the scope of the invention. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a conveyor of the type in which a length of roller-chain is entrained around first and second spaced apart sprocket assemblies to dispose a stretch of the roller-chain for load bearing on a guide plate interposed between the first and second sprocket assemblies and with the roller-chain being operable to transport a load in an axial direction defined by an axis oriented along the stretch of roller-chain, the improvement comprising:

a bed plate comprising a foundation plate and said guide plate, a top surface of said foundation plate receiving a bottom surface of said guide plate in a stacked arrangement effective to provide a normal support operable to resist bending deflection of said guide plate as a load is transported from a first end to a second end of said guide plate, said stacked arrangement further encompassing a slide-together fit structured to form an interference between structure associated with said foundation and structure associated with said guide plate, said interference being effective to resist separation of said guide plate away from said foundation plate in a direction normal to said top surface, wherein:

said foundation plate is adapted for attachment to structure of said conveyor; and said guide plate is adapted for removable attachment to said foundation plate.

2. The improvement of claim 1, wherein:
said foundation plate comprises a metal; and
said guide plate comprises a plastic.

3. The improvement of claim 1, wherein:
said foundation plate comprises a hold-down structure disposed on said top surface of said foundation plate; and
said guide plate comprises a socket disposed on said bottom surface of said guide plate, wherein:
a first portion of said socket is structured and arranged to receive said hold-own structure as said guide plate is displaced in a first direction that is substantially normal to said top surface; and
a second portion of said socket is structured and arranged to cause a structural interference with a portion of said hold-down structure subsequent to a displacement of said guide plate, in a second direction that is substantially transverse to said first direction, effective to accomplish said slide-together fit.

4. The improvement of claim 3, wherein:
said hold-down structure comprises a vertical member and a transverse member, said vertical member spacing said transverse member apart from said top surface;
said socket comprises a rim; and
in said installed configuration, said transverse member creates a structural interference with said rim to resist separation, in a direction normal to said top surface of said foundation plate, of said guide plate away from said foundation plate.

5. The improvement of claim 4, further comprising:
a plurality of hold-down structures distributed over an area of said foundation plate and a plurality of sockets arranged to engage with said plurality of hold-down structures.

6. The improvement of claim 4, wherein:
said vertical member of said hold-down structure is further arranged in harmony with structure of said socket whereby to resist motion in said axial direction of said guide plate with respect to said foundation plate beyond said installed configuration.

7. The improvement of claim 3, wherein:
said hold-down structure comprises an enlarged head carried on a substantially vertical stem.

8. The improvement of claim 7, wherein:
said stem is press-fit into receiving structure of said foundation plate.

9. The improvement of claim 7, wherein:
said stem is threaded into receiving structure of said foundation plate.

10. The improvement of claim 3, wherein:
said socket comprises a T-slot.

11. The improvement of claim 3, wherein:
said socket is disposed within a thickness of said guide plate to leave a top surface of said guide plate uninterrupted over a location of said socket.

12. The improvement of claim 3, wherein:
a hold-down system operable to resist motion, in a direction parallel to said top surface, of said guide plate relative to said foundation plate to retain said guide plate in said installed configuration, comprises:
a fastener disposed near an end of said guide plate for anchoring to structure associated with said foundation plate; and
a standoff disposed to receive said fastener through a thickness of said guide plate, said standoff being configured and arranged to resist over-tightening of said fastener.

13. The improvement of claim 1, wherein:
a lubricated sliding interface between said roller chain and said second material has a coefficient of friction lower than a corresponding coefficient of friction between steel-on-steel.

14. The improvement of claim 1, wherein:
a lubricated sliding interface between said roller chain and said second material has a coefficient of friction lower than a corresponding coefficient of friction between said roller chain and a hardened steel surface.

15. The improvement of claim 1, wherein:
a lubricated sliding interface between said roller chain and said second material has an effective dynamic coefficient of friction lower than about 0.08.

16. The improvement of claim 1, wherein:

said guide plate comprises a sheet of plastic material having mechanical wear properties at least substantially equivalent to Tyvar 88 plastic material.

17. A method for installing a guide plate for a roller-chain onto a roller-chain conveyor, comprising the steps of:
  a) disposing said guide plate at an elevated position with respect to, and substantially covering, a top surface of a foundation structure;
  b) lowering said guide plate for stacked engagement, at a first position disposed substantially underneath said elevated position, to orient a bottom surface of said guide pate substantially in the plane of said top surface of said foundation structure to place hold-down structure carried by said foundation structure into reception in retention socket structure, said socket structure being disposed in a thickness, and opening to a bottom surface, of said guide plate;
  c) transversely sliding said guide plate to a second position to engage a first portion of said hold-down structure with a second portion of said socket structure to form a structural interference between said first portion and said second portion operable to resist a displacement, in a direction normal to said top surface, of said guide plate away from said foundation structure; and
  d) installing a stop element to resist motion of said guide plate from said second position.

18. A bed plate for a roller-chain conveyor assembly, the bed plate comprising:
  a foundation platform and a guide plate, a top surface of said foundation platform receiving a bottom surface of said guide plate in a stacked arrangement, wherein:
    said foundation platform is adapted for attachment to structure of said conveyor to establish an alignment of said guide plate with respect to a portion of a roller chain of said conveyor assembly, said foundation platform further being structured to provide a distributed support for said bottom surface operable to resist bending deflection of said guide plate under a load transported along said conveyor assembly; and
    said guide plate is adapted for removable attachment to said foundation platform by way of structure comprising a plug-then-slide arrangement configured to permit replacement of said guide plate without compromising said alignment, a top surface of said guide plate carrying a plurality of ridge elements, said ridge elements being configured for reception between side plates of a strand of said roller-chain whereby to guide said strand along an axial path, a top surface of said ridge elements being adapted to support a roller element of said roller-chain for rolling engagement thereon.

19. The bed plate of claim 18, further comprising:
first hold-down structure carried by said guide plate and second hold-down structure carried by said foundation platform, said first and second hold-down structure being mutually arranged to form an interlocking engagement effected by a displacement of said guide plated relative to said foundation platform, said engagement forming a structural interference operable to resist displacement of said guide plate in a direction normal to said top surface of said foundation platform, away from engagement with said foundation platform.

20. The bed plate of claim 19, further comprising:
a retaining pin installable to pierce structure associated with said guide plate for reception of a portion of said retaining pin in structure associated with said foundation platform, said retaining pin being adapted to resist an axial displacement of said guide plate from an installed axial position.

21. The bed plate of claim 18, wherein:
said removable attachment is effected between a plurality of hold-down structures disposed in a plurality of rows and columns over an area of said foundation structure and a plurality of cooperatingly structured and arranged T-slot structures carried by said guide plate.

22. The bed plate of claim 18, wherein:
one of said hold-down structures comprises a stem affixed at a first end to said foundation platform, a second of said stem carrying an enlarged head, said stem having a length between said first and second ends sized such that said enlarged head is spaced apart from said top surface; and said enlarged head is configured in harmony with a socket portion of a said T-slot for insertion of said head, in a first direction, into reception in said socket, and subsequent transverse displacement of said head with respect to said socket, in a second direction effective to trap a shoulder portion of said T-slot between a portion of said head and said top surface.

23. A method for installing a guide plate for a roller-chain onto a roller-chain conveyor of a saw mill without necessitating removal of the chain drive sprockets associated with that guide plate, comprising the steps of:
  a) disposing said guide plate at an elevated position with respect to, and substantially overlapping, a top surface of a foundation structure;
  b) lowering said guide plate into engagement with said foundation structure to place a hold-down structure in reception within a retention socket structure;
  c) transversely sliding said guide plate to form a structural interference operable to resist a displacement, in a direction normal to said top surface, of said guide plate away from said foundation structure; and
  d) installing a stop element to resist motion of said guide plate from an installed position.

* * * * *